United States Patent [19]

Takahashi et al.

[11] Patent Number: 5,171,811
[45] Date of Patent: Dec. 15, 1992

[54] PROTECTIVE COATING MATERIAL

[75] Inventors: Yosuke Takahashi, Atsugi; Noriaki Oshima, Ebina; Yasuhiko Shida, Yamato, all of Japan

[73] Assignee: Tosoh Corporation, Shinnanyo, Japan

[21] Appl. No.: 778,657

[22] Filed: Oct. 18, 1991

[30] Foreign Application Priority Data

Oct. 23, 1990 [JP] Japan .................... 2-283387

[51] Int. Cl.$^5$ .................... C08F 236/00; C08F 222/10
[52] U.S. Cl. .................................... 526/283; 526/321
[58] Field of Search .......................... 526/283, 321

[56] References Cited

U.S. PATENT DOCUMENTS

| 3,815,239 | 6/1974 | Lee, Jr. et al. | 526/321 |
| 3,849,519 | 11/1974 | Kadowaki et al. | 526/321 |
| 4,362,848 | 12/1982 | Friedli et al. | 525/193 |

FOREIGN PATENT DOCUMENTS 0421567 4/1991 European Pat. Off. .
0430583 6/1991 European Pat. Off. .

Primary Examiner—Joseph L. Schofer
Assistant Examiner—Wu C. Cheng
Attorney, Agent, or Firm—Oblon, Spivak, McClelland, Maier & Neustadt

[57] ABSTRACT

A protective coating material comprising polyfunctional (meth)acrylate derivatives of the following formulas ①, ②, ③, ④ and ⑤ within the following ranges of a, b, c, d and e % by weight, respectively:

wherein each of $R_1$ to $R_3$ is H or $CH_3$, and $R_4$ is $CH_2CH_3$ or $CH_2OH$,

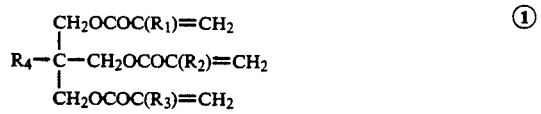

wherein each of $R_5$ to $R_{10}$ is H or $CH_3$,

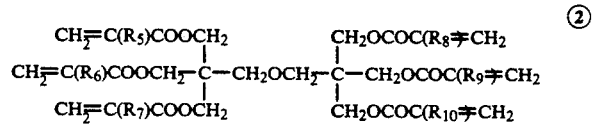

wherein each of $R_{11}$ and $R_{12}$ is H or $CH_3$, and n is an integer of from 3 to 14,

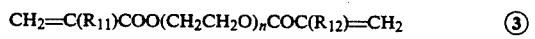

wherein each of $R_{13}$ and $R_{14}$ is H or $CH_3$, and $R_{15}$ is H or $CH_2OCOC(R_{19})=CH_2$ wherein $R_{19}$ is H or $CH_3$,

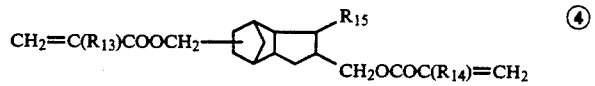

wherein each of $R_{16}$ and $R_{17}$ is H or $CH_3$, and n is an integer of from 2 to 10.

10 Claims, No Drawings

PROTECTIVE COATING MATERIAL

The present invention relates to a protective coating material. More particularly, it relates to a protective coating material which is useful for forming a protective coating having excellent scuff resistance and antistatic properties.

Protective coating materials are used in various fields. In recent years, a protective coating material is desired which is capable for forming a protective coating having various functions. For example, scuff resistance is required for a protective coating to be provided on the surface of a helmet shield material, and in addition to such scuff resistance, antistatic properties to prevent adhesion of dust are required for a protective coating to be provided on the surface of a window material, a counter screen, a peep window material for office appliances, a lighting cover or a recording medium such as an optical disk. Therefore, a protective coating material is desired which is capable of forming a protective coating having such functions.

It is an object of the present invention to provide a protective coating material which is useful for forming a protective coating having excellent scuff resistance and antistatic properties.

The present inventors have conducted extensive studies to satisfy the above requirements and as a result, have found it possible to obtain a protective coating having the desired functions by using polyfunctional (meth)acrylate derivatives. The present invention has been accomplished on the basis of this discovery.

Thus, the present invention provides a protective coating material comprising polyfunctional (meth)acrylate derivatives of the following formulas 1, 2, 3, 4 and 5 within the following ranges of a, b, c, d and e % by weight, respectively:

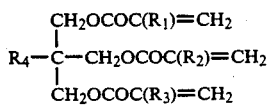  (1)

wherein each of $R_1$ to $R_3$ is H or $CH_3$, and $R_4$ is $CH_2CH_3$ or $CH_2OH$,

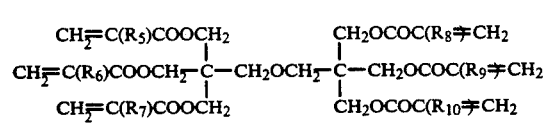  (2)

wherein each of $R_5$ to $R_{10}$ is H or $CH_3$, $$CH_2=C(R_{11})COO(CH_2CH_2O)_nCOC(R_{12})=CH_2 \quad (3)$$

wherein each of $R_{11}$ and $R_{12}$ is H or $CH_3$, and n is an integer of from 3 to 14,

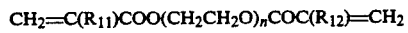  (4)

wherein each of $R_{13}$ and $R_{14}$ is H or $CH_3$, and $R_{15}$ is H or $CH_2OCOC(R_{19})=CH_2$ wherein $R_{19}$ is H or $CH_3$,

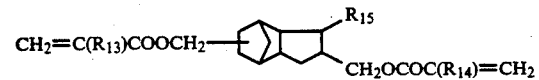  (5)

wherein each of $R_{16}$ and $R_{17}$ is H or $CH_3$, and n is an integer of from 2 to 10.

Now, the present invention will be described in detail with reference to the preferred embodiments.

The protective coating material of the present invention contains the compounds of the above formulas 1 and 2 in amounts of from 30 to 70% by weight, preferably from 35 to 70% by weight, and from 0 to 50% by weight, preferably from 1 to 30% by weight, respectively. By the incorporation of these compounds, scuff resistance is imparted to a protective coating obtainable from the protective coating material of the present invention. Here, if the content of the compound of the formula 1 is less than 30% by weight, no adequate scuff resistance can be imparted to the protective coating, and if it exceeds 70% by weight, no adequate antistatic properties can be imparted to the protective coating. On the other hand, if the coating material contains more than 50% by weight of the compound of the formula 2, the antistatic properties tend to deteriorate, and the shrinkage during curing tends to be substantial, such being undesirable. The compound of the formula 1 may, for example, be pentaerythritol triacrylate, pentaerythritol trimethacrylate, trimethylolpropane triacrylate, or trimethylolpropane trimethacrylate. The compound of the formula 2 may, for example, be dipentaerythritol hexacrylate, or dipentaerythritol hexamethacrylate.

The protective coating material of the present invention further contains from 30 to 70% by weight of the compound of the above formula 3, whereby antistatic properties will be imparted to the protective coating formed from the coating material. If the content of this compound is less than 30% by weight, no adequate antistatic properties tend to be imparted to the protective coating, and if it exceeds 70% by weight, no adequate scuff resistance tends to be imparted. As the compound of the formula 3, a diacrylate or dimethacrylate derived from a polyethylene glycol having an average molecular weight of from 200 to 600, is preferred. Here, if the compound is derived from a polyethylene glycol having an average molecular weight of less than 200, the polyethylene glycol chain of such a compound tends to be short, and the antistatic effects tend to be low. On the other hand, if the compound is derived from a polyethylene glycol having an average molecular weight exceeding 600, the hardness of such a compound tends to be low, and the water content tends to be high.

By the combination of the compounds of the formulas 1, 2 and 3, a resin system having both scuff resistance and antistatic properties, can be obtained. However, the protective coating material of the present invention further contains from 3 to 20% by weight of the compound of the formula 4. If the content of this compound is less than 3% by weight, the coating uniformity tends to be lost, and if it exceeds 20% by weight, the antistatic properties tend to deteriorate. By the incorporation of this compound, the coating uniformity will be imparted to the protective coating material of the present invention, and in particular, an affinity to e.g. polyolefin or polycarbonate useful for an optical disk substrate, is increased and the leveling properties of the protective coating material will be increased. Specific examples of such a compound include hydroxydicyclopentadienyl diacrylate, bis(hydroxymethyl)-tricyclo-[5,2,1,0$^{2,6}$]decanediacrylate, hydroxydicyclopentadienyl dimethacrylate, tris(hydroxymethyl)-tricyclo-[5,2,1,0$^{2,6}$]decanedimethacrylate, hydroxydicyclopentadienyl triacrylate tris (hydroxymethyl)-tricyclo[5,2,1,0$^{2,6}$]decane triacrylate and hydroxydicyclopentadienyl trimethacrylate tris(hydroxymethyl)-tricyclo[5,2,1,0$^{2,6}$]decane trimethacrylate.

Further, the protective coating material of the present invention may contain the compound of the formula 5, as the case requires. This compound serves to improve adhesion of the protective coating material. The compound of the formula 5 is incorporated in an amount of at most 50% by weight. Preferred amount is from 1 to 50% by weight. However, this compound may not be incorporated at all. If the amount exceeds 50% by weight, the affinity of the protective coating material of the present invention to the substrate tends to be too high, and it is likely to dissolve the surface of polycarbonate used as an optical disk substrate, whereby the surface tends to have turbidity.

The compound of the formula 5 may, for example, be ethylene glycol diacrylate, ethylene glycol dimethacrylate, 1,3-propanediol diacrylate, 1,3-propanediol dimethacrylate, 1,4-butanediol diacrylate, 1,4-butanediol dimethacrylate, 1,5-pentanediol diacrylate, 1,5-pentanediol dimethacrylate, 1,6-hexanediol diacrylate, 1,6-hexanediol dimethacrylate, 1,7-heptanediol diacrylate, 1,7-heptanediol dimethacrylate, 1,8-octanediol diacrylate, 1,8-octanediol dimethacrylate, 1,9-nonanediol diacrylate, 1,9-nonanediol dimethacrylate, 1,10-decanediol diacrylate, or 1,10-decanediol dimethacrylate.

Further, the protective coating material of the present invention may contain a compound of the following formula 6' or 7 i.e. a surfactant of a polyoxyethylene polyoxypropylene-condensed type or a surfactant of polyoxyethylene polyoxypropylene-condensed ethylenediamine derivative, whereby the leveling properties of the protective coating material of the present invention can be further improved.

$$HO(C_2H_4O)_x\text{---}(C_3H_6O)_y\text{---}(C_2H_4O)_zH \qquad (6)$$

wherein x, y and z are numbers satisfying $10 \leq x+y+z \leq 100$.

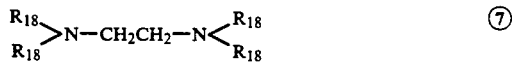

$$\begin{array}{c}R_{18}\\R_{18}\end{array}\!\!>\!\!N\text{---}CH_2CH_2\text{---}N\!\!<\!\!\begin{array}{c}R_{18}\\R_{18}\end{array} \qquad (7)$$

wherein $R_{18}$ is $(C_3H_6O)_m(C_2H_4O)_nH$ wherein n and m are numbers satisfying $2 \leq m+n \leq 50$.

With the compound of formula 6, if $x+y+z$ is less than 10, the leveling properties will be low, and if $x+y+z$ exceeds 100, the molecular weight will be so large that the compatibility tends to be poor. With the compound of the formula 7, if $m+n$ is less than 2, the leveling properties tend to be low, and if $m+n$ exceeds 50, the molecular weight tends to be so large that the incorporated to a system, a problem of bleeding out with time is usually pointed out. However, the amount of the compound of the formula 6 or 7 may be minimized by the compound of the formula 4 and may provide adequate effects with an amount of not higher than 1% by weight to the protective coating material. With such a small amount, there will be no problem of bleeding out which otherwise causes coating defects or coating stains with time. As the compound of the formula 6 or 7, a series of Pluronic L-121, Tetronic TR 702 (manufactured by Asahi Denka K.K.) or the like, may, for example, be used.

When a coating layer is to be formed using a protective coating material of the present invention constructed as described in the foregoing, a conventional method such as a spin coating method, a doctor blade method or a dipping method, may be employed, and the thickness of the coating layer is preferably from 0.5 to 30 μm. After coating, the protective coating material is cured by heating or by irradiation of light. For this purpose, an initiator may optionally be incorporated to the protective coating material, as the case requires. For example, when curing is conducted by ultraviolet rays, an initiator which is activated by ultraviolet rays, such as 1-hydroxydicyclohexylphenyl ketone, 2,2-dimethoxy-1,2-diphenylethan-1-on, benzophenone or diethoxyacetophenone, may be incorporated in an amount of from 0.1 to 10% by weight to the protective coating material. Further, a heat stabilizer, an antioxidant and other additives may be incorporated to the protective coating material of the present invention in an amount not to impair the desired properties.

As described in the foregoing, the protective coating formed by the protective coating material of the present invention is excellent in the scuff resistance and has antistatic properties. Further, the protective coating material of the present invention, is excellent in the uniform coating properties, whereby a protective layer on the surface of a recording medium such as an optical disk, can be formed in good yield.

Now, the present invention will be described in further detail with reference to Examples. However, it should be understood that the present invention is by no means restricted to such specific Examples.

EXAMPLE 1

450 g of trimethylolpropane triacrylate, 450 g of nonaethylene glycol diacrylate and 100 g of hydroxydicyclopentadienyl diacrylate were mixed to obtain a base resin for a coating material. To the entire amount of this base resin, 5 g of Tetronic TR-702 (manufactured by Asahi Denka K.K.) as a leveling agent and 10 g of 1-hydroxycyclohexylphenyl ketone as an ultraviolet polymerization initiator, were added to obtain a protective coating material. 2 g of this coating material was dispensed on a 5.25 inch optical magnetic disk substrate made of polycarbonate and coated in a thickness of 10 μm by a spin coating method, and the coated material was cured by exposure to ultraviolet rays for 20 seconds in a nitrogen atmosphere to form the desired surface protective coating layer. The total irradiation dose of ultraviolet rays during this exposure was 1,500 mJ/cm$^2$ (λ=365 nm).

In the same manner, the surface protective coating was applied to 300 optical magnetic disk substrates. The pencil hardness and the volume resistivity of the disk surface having this surface protective coating layer formed, were measured. The results and the yield during the preparation are shown in Table 1. Various measurements were conducted in the following manners.

Pencil hardness: Measured in accordance with JIS K-6911

Volume resistivity: The volume resistivity was measured under an applied voltage of 500 V by means of a surface resistivity measuring apparatus (TERAOHMMETER R-530, manufactured by Kawaguchi Denki K.K.)

Adhesion: The adhesion was examined by a cross cut peeling test.

Yield: Coating defects of the coating layer were visually inspected, and a product free from fish eyes, orange peel and dents was regarded as an acceptable product.

EXAMPLE 2

350 g of trimethylolpropane triacrylate, 600 g of nonaethylene glycol diacrylate and 50 g of hydroxydicyclopentadienyl diacrylate were mixed to obtain a base resin for a coating material. To the entire amount of this base resin, 5 g of Tetronic TR-702 (manufactured by Asahi Denka K.K.) as the leveling agent and 1 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. The pencil hardness and the volume resistivity of the disk surface having this surface protective coating layer formed, were measured in the same manner as in Example 1. The results and the yield during the preparation are shown in Table 1.

EXAMPLE 3

350 g of trimethylolpropane triacrylate, 600 g of nonaethylene glycol diacrylate and 50 g of hydroxydicyclopentadienyl diacrylate were mixed to obtain a base resin for a coating material. To the entire amount of this base resin, 5 g of Pluronic L-121 (manufactured by Asahi Denka K.K.) as a leveling agent and 1 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. In the same manner as in Example 1, the pencil hardness and the volume resistivity of the disk surface having the surface protective coating layer formed, were measured. The results and the yield during the preparation are shown in Table 1.

EXAMPLE 4

300 g of pentaerythritol triacrylate, 600 g of nonaethylene glycol diacrylate, 50 g of hydroxydicyclopentadienyl diacrylate and 50 g of 1,6-hexanediol diacrylate were mixed to obtain a base resin for a coating material. To the entire amount of this base resin, 5 g of Tetronic TR-702 (manufactured by Asahi Denka K.K.) as a leveling agent and 1 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. In the same manner as in Example 1, the pencil hardness and the volume resistivity of the disk surface having this surface protective coating layer formed, were measured. The results and the yield during the preparation are shown in Table 1.

EXAMPLE 5

300 g of trimethylolpropane triacrylate, 600 g of nonaethylene glycol diacrylate, 50 g of hydroxydicyclopentadienyl diacrylate and 50 g of 1,6-hexanediol diacrylate, were mixed to obtain a base resin for a coating material. To the entire amount of this base resin, 5 g of Tetronic TR-702 manufactured by Asahi Denka K.K.) as a leveling agent and 1 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. In the same manner as in Example 1, the pencil hardness and the volume resistivity of the disk surface having the surface protective coating layer formed, were measured. The results and the yield during the preparation are shown in Table 1.

EXAMPLE 6

300 g of trimethylolpropane triacrylate, 50 g of dipentaerythritol hexacrylate, 550 g of nonaethylene glycol diacrylate, 50 g of hydroxydicyclopentadienyl diacrylate and 50 g of 1,6-hexanediol diacrylate were mixed to obtain a base resin for a coating material.

To the entire amount of this base resin, 5 g of Tetronic TR-702 (manufactured by Asahi Denka K.K.) as a leveling agent and 1 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. In the same manner as in Example 1, the pencil hardness and the volume resistivity of the disk surface having the surface protective coating layer formed, were measured. The results and the yield during the preparation are shown in Table 1.

EXAMPLE 7

300 g of pentaerythritol triacrylate, 50 g of dipentaerythritol hexacrylate, 550 g of nonaethylene glycol diacrylate, 50 g of hydroxydicyclopentadienyl diacrylate and 50 g of 1,6-hexanediol diacrylate were mixed to obtain a base resin for a coating material.

To the entire amount of this base resin, 5 g of Tetronic TR-702 (manufactured by Asahi Denka K.K.) as a leveling agent and 1 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. In the same manner as in Example 1, the pencil hardness and the volume resistivity of the disk surface having the surface protective coating layer formed, were measured. The results and the yield during the preparation are shown in Table 1.

EXAMPLE 8

350 g of pentaerythritol triacrylate, 300 g of nonaethylene glycol diacrylate, 50 g of hydroxydicyclopentadienyl diacrylate and 300 g of 1,6-hexanediol diacrylate were mixed to obtain a base resin for a coating material.

To the entire amount of this base resin, 5 g of Tetronic TR 702 (manufactured by Asahi Denka K.K.) as a leveling agent and 30 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. In the same manner as in Example 1, the pencil hardness and the volume resistivity of the disk surface having the surface protective coating layer formed, were measured. The results and the yield during the preparation are shown in Table 1.

EXAMPLE 9

300 g of trimethylolpropane acrylate, 100 g of dipentaerythritol hexacrylate, 550 g of nonaethylene glycol diacrylate and 50 g of hydroxydicyclopentadienyl diacrylate were mixed to obtain a base resin for a coating material.

To the entire amount of this base resin, 5 g of Tetronic TR-702 (manufactured by Asahi Denka K.K.) as a leveling agent and 30 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. In the same manner as in Example 1, the pencil hardness and the volume resistivity of the disk surface having the surface protective coating layer formed, were measured. The results and the yield during the preparation are shown in Table 1.

COMPARATIVE EXAMPLE 1

450 g of trimethylolpropane triacrylate and 450 g of nonaethylene glycol diacrylate were mixed to obtain a base resin for a coating material.

To the entire amount of this base resin, 4.5 g of Tetronic TR-702 (manufactured by Asahi Denka K.K.) as a leveling agent and 9 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. In the same manner as in Example 1, the pencil hardness and the volume resistivity of the disk surface having this surface protective coating layer formed, were measured. The results and the yield during the preparation are shown in Table 1.

COMPARATIVE EXAMPLE 2

100 g of trimethylolpropane triacrylate, 850 g of nonaethylene glycol diacrylate and 50 g of hydroxydicyclopentadienyl diacrylate were mixed to obtain a base resin for a coating material.

To the entire amount of this base resin, 4.5 g of Tetronic TR-702 (manufactured by Asahi Denka K.K.) as a leveling agent and 9 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. In the same manner as in Example 1, the pencil hardness and the volume resistivity of the disk surface having the surface protective coating layer formed, were measured. The results and the yield during the preparation are shown in Table 1.

COMPARATIVE EXAMPLE 3

300 g of trimethylolpropane triacrylate, 600 g of dipentaerythritol hexacrylate, 50 g of nonaethylene glycol diacrylate and 50 g of hydroxydicyclopentadienyl diacrylate were mixed to obtain a base resin for a coating material.

To the entire amount of this base resin, 5 g of Tetronic TR-702 (manufactured by Asahi Denka K.K.) as a leveling agent and 9 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared, whereby the shrinkage of the coating material was so large that the disk underwent warpage to the coating layer side. Further, in the same manner as in Example 1, the pencil hardness and the volume resistivity of the disk surface were measured. The results and the yield during the preparation are shown in Table 1.

COMPARATIVE EXAMPLE 4

300 g of trimethylolpropane triacrylate, 300 g of nonaethylene glycol diacrylate and 400 g of hydroxydicyclopentadienyl diacrylate were mixed to obtain a base resin for a coating material. To the entire amount of this base resin, 5 g of Tetronic TR-702 (manufactured by Asahi Denka K.K.) as a leveling agent and 9 g of 1-hydroxycyclohexylphenyl ketone as an ultraviolet polymerization initiator, were added to obtain a protective coating material.

Using this coating material, an optical magnetic disk substrate having a surface protective coating layer formed in the same manner as in Example 1, was prepared. In the same manner as in Example 1, the pencil hardness and the volume resistivity of the disk surface having the surface protective coating layer formed, were measured. The results and the yield during the preparation are shown in Table 1.

TABLE 1

| | Pencil hardness | Volume resistivity ($\Omega$ cm) | Adhesion | Yield (%) |
|---|---|---|---|---|
| Example 1 | HB | $7.8 \times 10^{14}$ | 100/100 | 100 |
| Example 2 | HB | $3.2 \times 10^{13}$ | 100/100 | 100 |
| Example 3 | HB | $3.5 \times 10^{13}$ | 100/100 | 100 |
| Example 4 | HB | $2.8 \times 10^{13}$ | 100/100 | 100 |
| Comparative Example 1 | HB | $7.3 \times 10^{14}$ | 100/100 | 72 |
| Example 5 | HB | $3.5 \times 10^{13}$ | 100/100 | 100 |
| Example 6 | H | $8.5 \times 10^{14}$ | 100/100 | 100 |
| Example 7 | H | $8.2 \times 10^{14}$ | 100/100 | 100 |
| Example 8 | HB | $5.2 \times 10^{14}$ | 100/100 | 100 |
| Example 9 | H | $4.7 \times 10^{14}$ | 100/100 | 100 |
| Comparative Example 2 | 2B | $5.2 \times 10^{11}$ | 100/100 | 70 |
| Comparative Example 3 | 2H | $7.6 \times 10^{17}$ | 100/100 | 100 |
| Comparative Example 4 | HB | $2.3 \times 10^{17}$ | 100/100 | 100 |

We claim:

1. A protective coating material comprising polyfunctional (meth)acrylate derivatives of the following formulas 1, 2, 3, 4 and 5 within the following ranges of a, b, c, d and e % by weight, respectively:

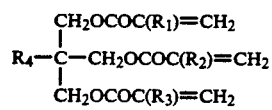

wherein each of $R_1$ to $R_3$ is H or $CH_3$, and $R_4$ is $CH_2CH_3$ or $CH_2OH$,

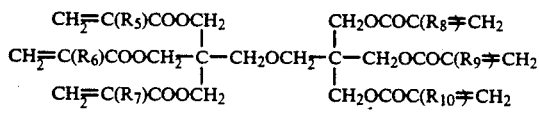 (2)

wherein each of $R_5$ to $R_{10}$ is H or $CH_3$, $$CH_2=C(R_{11})COO(CH_2CH_2O)_nCOC(R_{12})=CH_2 \quad (3)$$

wherein each of $R_{11}$ and $R_{12}$ is H or $CH_3$, and n is an integer of from 3 to 14,

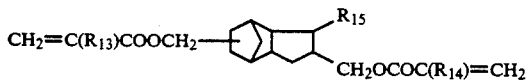 (4)

wherein each of $R_{13}$ and $R_{14}$ is H or $CH_3$, and $R_{15}$ is H or $CH_2OCOC(R_{19})=CH_2$ wherein $R_{19}$ is H or $CH_3$, $$CH_2=C(R_{16})COO(CH_2)_nOCOC(R_{17})=CH_2 \quad (5)$$

wherein each of $R_{16}$ and $R_{17}$ is H or $CH_3$, and n is an integer of from 2 to 10.

2. The protective coating material according to claim 1, which contains a leveling agent.

3. The protective coating material according to claim 2, wherein the leveling agent is a surfactant of a polyoxyethylene polyoxypropylene-condensed type.

4. The protective coating material according to claim 2, wherein the leveling agent is a surfactant of a polyoxyethylene polyoxypropylene-condensed ethylenediamine derivative.

5. The protective coating material according to claim 1, wherein the compound of the formula 1 is from 35 to 70% by weight, the compound of the formula 2 is from 1 to 30% by weight, and the compound of the formula 5 is from 1 to 50% by weight.

6. The protective coating material according to claim 1, wherein the compound of the formula 1 is pentaerythritol triacrylate, pentaerythritol trimethacrylate, trimethylpropane triacrylate or trimethylolpropane trimethacrylate, and the compound of the formula 2 is dipentaerythritol hexacrylate or dipentaerythritol hexamethacrylate.

7. The protective coating material according to claim 1, wherein the compound of the formula 3 is a diacrylate or dimethacrylate derived from a polyethylene glycol having an average molecular weight of from 200 to 600.

8. The protective coating material according to claim 1, wherein the compound of the formula 5 is ethylene glycol diacrylate, ethylene glycol dimethacrylate, 1,3-propanediol diacrylate, 1,3-propanediol dimethacrylate, 1,4-butanediol diacrylate, 1,4-butanediol dimethacrylate, 1,5-pentanediol diacrylate, 1,5-pentanediol dimethacrylate, 1,6-hexanediol diacrylate, 1,6-hexanediol dimethacrylate, 1,7-heptanediol diacrylate, 1,7-heptanediol dimethacrylate, 1,8-octanediol diacrylate, 1,8-octanediol dimethacrylate, 1,9-nonanediol diacrylate, 1,9-nonanediol dimethacrylate, 1,10-decanediol diacrylate or 1,10-decanediol dimethacrylate.

9. The protective coating material according to claim 1, which further contains not higher than 1% by weight of a compound of the following formula 6 or 7 :

$$HO(C_2H_4O)_x-(C_3H_6O)_y-(C_2H_4O)_zH \quad (6)$$

wherein x, y and z satisfy $10 \leq x+y+z \leq 100$,

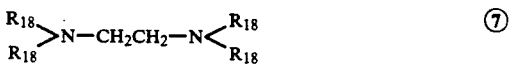 (7)

wherein $R_{18}$ is $(C_3H_6O)_m(C_2H_4O)_nH$ wherein n and m satisfy $2 \leq m+n \leq 50$.

10. The protective coating material according to claim 1, wherein the compound of formula 4 is:

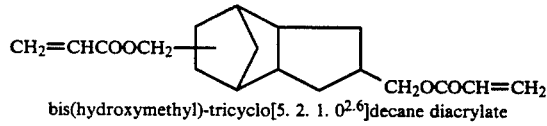

bis(hydroxymethyl)-tricyclo[5. 2. 1. $0^{2,6}$]decane diacrylate

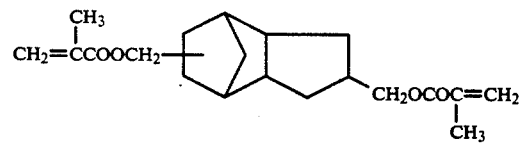

bis(hydroxymethyl)-tricyclo[5. 2. 1. $0^{2,6}$]decane dimethacrylate,

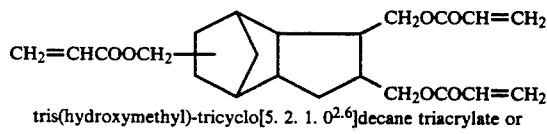

tris(hydroxymethyl)-tricyclo[5. 2. 1. $0^{2,6}$]decane triacrylate or

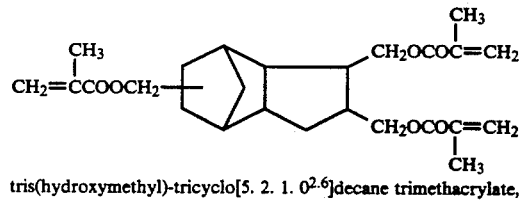

tris(hydroxymethyl)-tricyclo[5. 2. 1. $0^{2,6}$]decane trimethacrylate,

* * * * *